Figure 1:
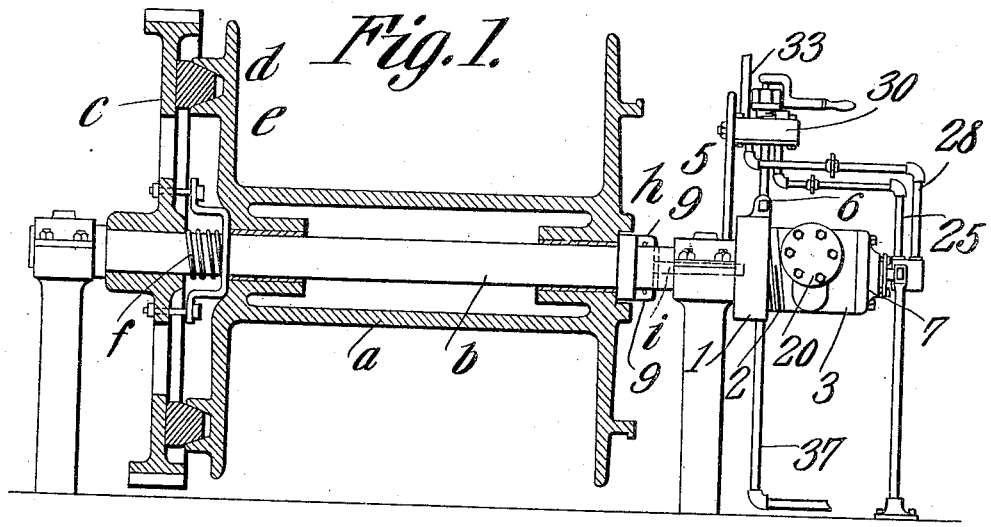

H. L. TURNEY.
CLUTCH OPERATING MECHANISM.
APPLICATION FILED MAY 9, 1908.

914,536.

Patented Mar. 9, 1909.

3 SHEETS—SHEET 1.

Witnesses

Inventor
Harry L. Turney.
By C. A. Snow & Co.
Attorneys

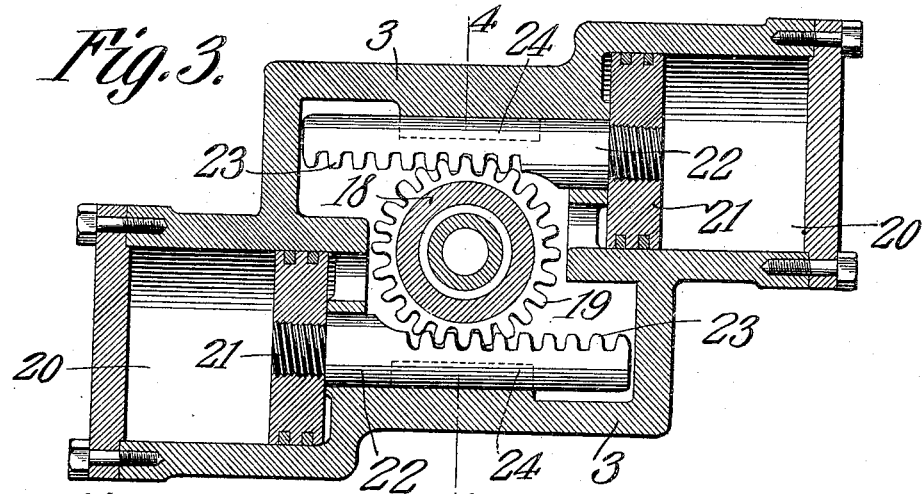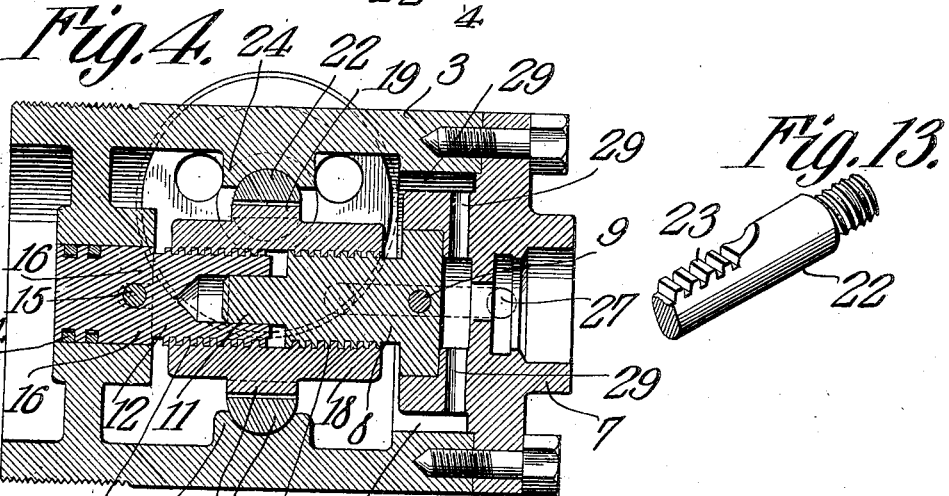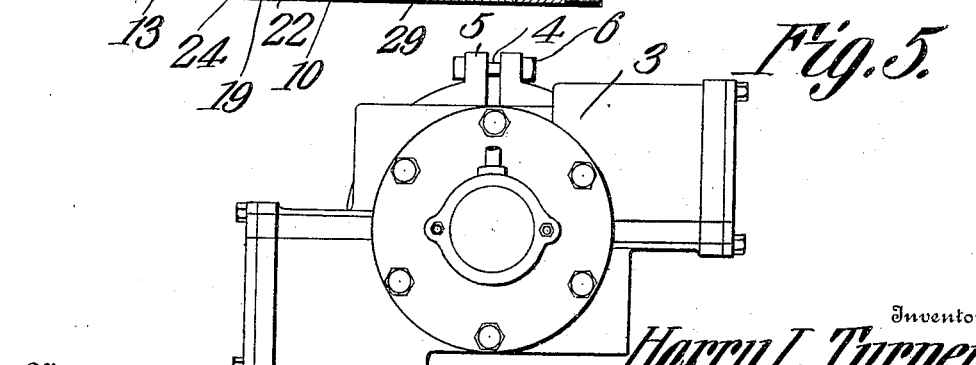

H. L. TURNEY.
CLUTCH OPERATING MECHANISM.
APPLICATION FILED MAY 9, 1908.
914,536.
Patented Mar. 9, 1909.
3 SHEETS—SHEET 3.
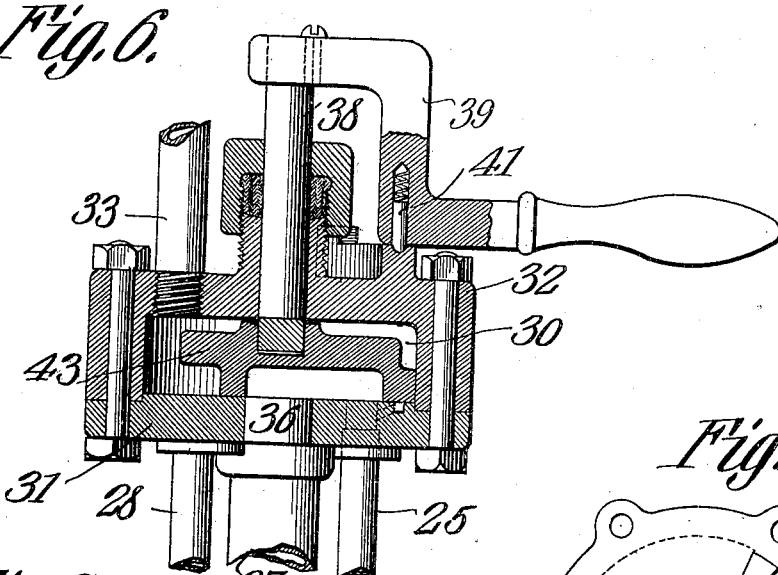
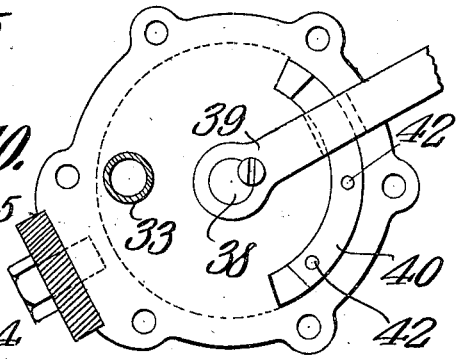
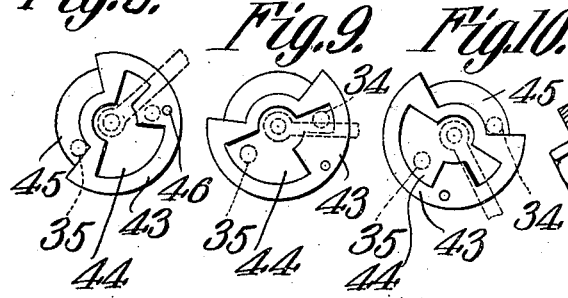
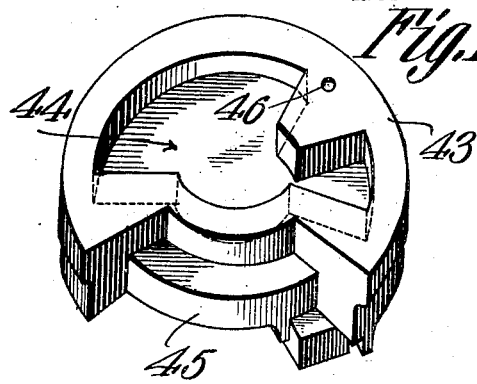
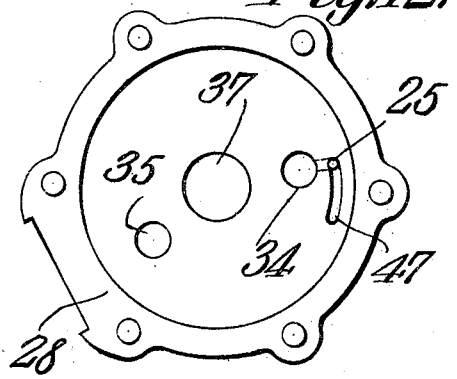
Witnesses
Inventor
Harry L. Turney.
By C. A. Snow & Co
Attorneys

UNITED STATES PATENT OFFICE.

HARRY LEON TURNEY, OF PORTLAND, OREGON.

CLUTCH-OPERATING MECHANISM.

No. 914,536.  Specification of Letters Patent.  Patented March 9, 1909.

Application filed May 9, 1908. Serial No. 431,961.

*To all whom it may concern:*

Be it known that I, HARRY L. TURNEY, a citizen of the United States, residing at Portland, in the county of Multnomah and State of Oregon, have invented a new and useful Clutch-Operating Mechanism, of which the following is a specification.

This invention has relation to friction clutch mechanisms or mechanism for operating friction clutches and it consists in the novel construction and arrangement of its parts as hereinafter shown and described.

The object of the invention is to provide a mechanism of novel construction which is adapted to effectually engage and disengage the members of a friction clutch by imparting to one of the members a thrust movement to engage the other member.

The operating mechanism, generally stated, consists primarily in a longitudinally movable thrust pin which is located in alinement with a fixed abutment. The abutment is exteriorly screw threaded and a threaded member is interposed between said abutment and pin. The threads upon the abutment and member are oppositely disposed, that is to say, one of them is a right hand thread while the other is a left hand thread. An internally threaded sleeve is arranged to engage the threads of the said abutment and member and is provided upon its exterior with a pinion or gear portion which intermeshes with gear racks provided upon longitudinally movable piston rods.
Cylinders are arranged at opposite sides of a casing which contains the mechanism above described and pistons are arranged for reciprocation in the said cylinders and are attached to the said piston rods. Means is provided for admitting a fluid under pressure into the cylinders at the opposite sides of the said pistons whereby the said pistons are moved and through the said piston rods and gear pinion the sleeve is rotated. During the rotation of the sleeve it moves longitudinally along the abutment and as the member which is interposed between the abutment and the thrust pin is held against rotation the said member moves longitudinally with the sleeve and also moves longitudinally relative to the sleeve. The sum of these two movements of the said member is transmitted to the thrust pin. An advantage gained by this arrangement is that no amount of stress upon the thrust pin can have any effect in reversing the movement above described as the parts are so arranged as to positively remain locked in any position of advancement of the thrust pin and the said pin can retract only as a result of the member located between the pin and the abutment being withdrawn by the admission of fluid pressure into the cylinders at the opposite sides of the pistons from those to which the pressure is applied to advance the said member.

Figure 2:
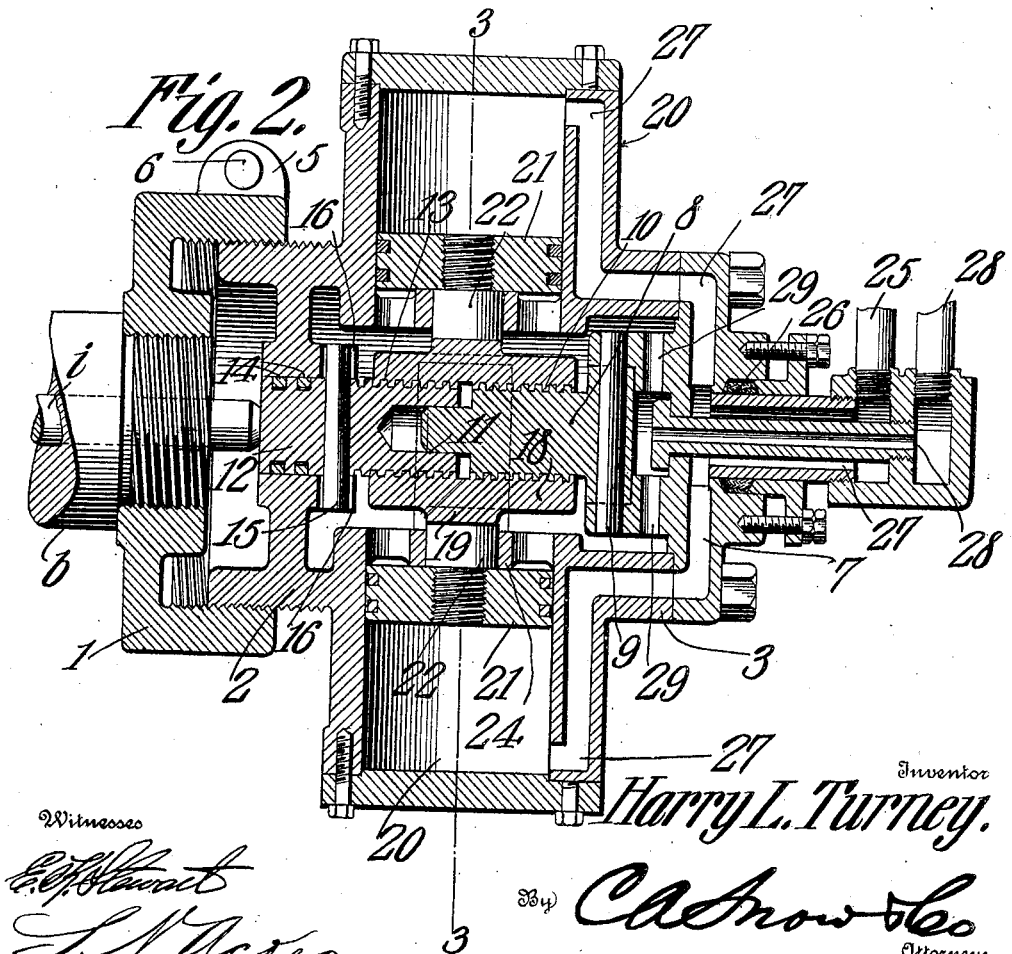

In the accompanying drawings: Figure 1 is a sectional elevation of a clutch with the clutch operating mechanism connected therewith. Fig. 2 is a horizontal sectional view of the clutch operating mechanism. Fig. 3 is a transverse sectional view of the clutch operating mechanism cut on the line 3, 3 of Fig. 2. Fig. 4 is a vertical sectional view of the clutch operating mechanism cut on the line 4, 4 of Fig. 3. Fig. 5 is an end elevation of the clutch operating mechanism. Fig. 6 is a vertical sectional view of a valve for controlling the pressure fluid supplied to the clutch operating mechanism. Fig. 7 is a plan view of said valve. Figs. 8, 9 and 10 are bottom views of a valve disk used in the said valve and illustrating the same in three different positions. Fig. 11 is a perspective view showing the under side of said valve disk. Fig. 12 is a plan view of the bottom of the valve casing, and Fig. 13 is a perspective view of a portion of one of the piston rods used in the clutch operating mechanism.

The clutch operating mechanism is especially designed to be used in connection with logging or hoisting engines wherein a winding drum $a$ is loosely mounted on a shaft $b$ to which is keyed or otherwise secured a driving gear $c$. Said gear carries an annular friction ring $d$ which is arranged to be engaged by the tapered walls of an annular groove $e$ formed at one end of the drum, and the drum and gear are normally separated by means of an expansion spring $f$. One end of the shaft is provided with a diametrically disposed slot through which extends a cross key $g$ that is arranged to operate against a collar $h$, the collar bearing against one end of the winding drum $a$. The cross key is engaged by a thrust pin $i$ and when the latter is moved in the direction of the key, the key presses against the collar $h$ and the latter shifts the winding drum longitudinally of the shaft until the drum is clutched to the gear wheel, so that rotative movement will then be imparted from the gear wheel to the winding drum. When endwise pressure on this thrust pin $i$ is removed, the spring $f$ separates the drum from the gear wheel to permit unwinding.

The present invention relates to means for actuating the thrust pin $i$. The cap 1 is screw threaded upon the end of the shaft $b$ and is internally threaded and adapted to engage the thread 2 provided upon the end of the casing 3. Said cap is split at one side as at 4 and is provided at the opposite side of the said split with the lugs 5 which are spaced apart. The bolt 6 passes through the said lugs and when tightened up slightly reduces the diameter of the cap 1 which becomes clamped in fixed position upon the end of the casing 3. By means of so mounting the said cap upon the casing the shaft $b$ may be adjusted longitudinally with relation to the casing so that as the annulus $d$ wears the gear $c$ may be moved toward the said casing whereby the said wear is compensated for. The opposite end of the casing 3 is closed by a head or abutment plate 7. The member 8 is fixed with relation to the plate 7 by means of the pin 9 which passes transversely through the inner portions of the said plate and the end portion of the member 8. That part of the member 8 which lies beyond the inner wall of the abutment 7 is substantially cylindrical and is screw threaded as at 10. The extreme end portion of the said member is diametrically reduced as at 11 and is also of cylindrical contour. The member 12 is interposed between the fixed member 8 and the end of the thrust pin $i$. The member 12 is provided upon its exterior with a thread 13 which is disposed opposite to the thread 10 upon the member 8, that is to say, the thread upon the member 8 is what is generally known as a left hand thread while the thread upon the member 12 is what is known as a right hand thread. The end portion of the member 12 is provided with packing rings 14 which operate against the wall of an orifice provided in the end of the casing 3. The member 12 is held against rotation by means of a cross pin 15 which is adapted to slide laterally between the lugs 16 mounted at the end wall of the casing 3. The inner end of the member 12 is provided with a concentric recess which snugly receives the reduced portion 11 of the member 8. The sleeve 18 is internally threaded with threads to correspond with the threads 10 and 13 and the threads of the said sleeve engage the threads upon the said members. Said sleeve is provided upon its exterior with a pinion or gear portion 19. The cylinders 20 are located at opposite sides of the casing 3 and the pistons 21 are mounted for reciprocation in the said cylinders. Each piston is provided with a piston rod 22 which is provided at one side with a gear rack 23. The said gear racks mesh with the pinion 19 at opposite sides thereof and the piston rods 22 are arranged to move between the guides 24 which in turn are mounted at the sides of the casing 3. The steam pipe 25 extends through the stuffing box 26 provided upon the plate 7 and communicates with the steam passages 27 which in turn communicate with the outer end portions of the cylinders 20. Within the steam pipe 25 is arranged a second steam pipe 28 that communicates with the passages 29 which in turn communicate with the inner ends of the cylinders 20. Thus it will be seen that when steam or other fluid under pressure is admitted through the pipe 25 into the passages 27 and the outer ends of the cylinders 20 that the pistons 21 will be moved toward the center of the casing 3 and the piston rods 22 moving with the said piston and having their gear racks 23 in mesh with the pinion 19 of the sleeve 18 will rotate the said sleeve. As the said sleeve rotates its thread meshing with the thread 10 upon the fixed member 8 will cause the said sleeve to move longitudinally along the said member at the same time the member 12 is held against rotation and its thread 13 being in engagement with the thread of the sleeve 18. The said member 12 is advanced with the sleeve and also moves longitudinally with relation to the same. The movement of the member 12 is imparted directly to the thrust pin $i$ which operates upon the movable member of the friction clutch through the intervening parts above described. Thus it will be seen that the sum total of the movement of the member 12 is equal to the movement of the sleeve longitudinally along the member 8 and the movement of the said member 12 with relation to the said sleeve. This movement is ample to effectually engage the clutch members. It will also be seen that by reason of the disposition of the threads 10 and 13 in the sleeve 18 that the thrust pin $i$ cannot retract its outward movement until the member 12 is moved toward the member 8 by reversing the operation above described. This is accomplished by admitting steam through the pipe 28 and passages 29 into the casing 3 when the said pressure will operate upon the inner sides of the pistons 21 and move the same away from the middle of the casing 3.

At any convenient point is arranged a valve chamber or casing 30 including a ported base 31 and a cap or bonnet 32. The latter being placed into communication with a source of pressure supply through a pipe 33. The base 31 is provided with two steam ports 34 and 35 which communicate with the pipes 25 and 28 respectively and is further provided with an exhaust port 36 that communicates with a discharge pipe 37. The cap or bonnet has a stuffing box through which the valve stem 38 passes and the handle 39 is mounted upon the upper end of said valve stem and passes over the segment 40 mounted upon the top of the bonnet 32. The said handle is provided with a spring actuated pin 41 which is adapted to engage depressions 42 provided in the segment 40 for the purpose of holding the handle 39 at a shifted position as the valve disk is turned within the chamber. The disk 43 is mounted within the chamber 30 and rotates with the stem 38. The said disk is provided in its under side with a recess 44 which may be moved so as to bring the ports 35 and 34 in communication with the exhaust port 36, as illustrated in Fig. 9. When the disk is in this position the clutch operating mechanism is at rest. When however it is desired to admit steam into the outer ends of the cylinders 20 the disk 43 is turned so that the port 34 will be under the ledge 45 at the cut away portion of the periphery of the disk and the port 35 will still be under the recess 44 in the disk. This position of parts is illustrated in Fig. 10 when the steam pressure can pass through the port 34 and the port 35 is in communication with the exhaust 36 so that there will be no compression within the casing 3. When it is desired to admit steam pressure into the casing 3 the disk 43 is moved into the position as shown in Fig. 8 when the port 35 lies under the shelf portion 45 of the valve disk and consequently the steam may pass from the chamber through the said port into the casing 3. At the same time the disk is provided with a vent 46 which is adapted to move over the by-pass 47 and which admits a small quantity of steam from the interior of the chamber into the port 34. Thus a small quantity of steam is permitted to pass through the said port 34 and pipe 25 which steam forms a cushion in the outer ends of the cylinders 20 and prevents the pistons 21 from striking with force against the ends of the said cylinders. This steam cushion is required when the pistons are moving outward for the reason that the operating mechanism is not at that time under a load, but the pistons do not require a cushion when moving in the opposite direction for the reason that during such movement the operating mechanism is under a load.

Having thus described the invention what is claimed is:

1. In clutch operating mechanism, a casing, a stationary member, a relatively movable member, a fluid pressure actuated member connecting the stationary and movable members, a clutch operating device actuated by the movable member, and means for controlling the admission and exhaust of an operating fluid.

2. In clutch operating mechanism, a casing, a stationary member, a relatively movable member, a fluid pressure actuated member connecting the stationary and movable members, a clutch operating device actuated by the movable member, means for admitting an operating fluid to the casing, and a ported valve for controlling the admission and exhaust of an operating fluid.

3. In clutch operating mechanism, a shaft, a casing secured to the shaft, relatively stationary and movable members disposed within the casing, a clutch operating device actuated by the movable member, pistons operatively connected with said members, means for admitting fluid to the pistons, and means for controlling the admission and exhaust of the operating fluid.

4. In clutch operating mechanism, a shaft, a casing secured to the shaft, relatively stationary and movable members disposed within the casing, a sleeve connecting said members and provided with a gear wheel, pistons operating within the casing and provided with racks meshing with the teeth on the gear wheel, a clutch operating device actuated by the movable member, means for admitting an operating fluid to the pistons, and means for controlling the admission and exhaust of said operating fluid.

5. In clutch operating mechanism, a shaft, a casing secured to the shaft, relatively stationary and movable members disposed within the casing and threaded exteriorly in opposite directions, a correspondingly threaded sleeve connecting said members and provided with a peripheral gear, a clutch operating device actuated by the movable member, pistons operating within the casing and provided with racks meshing with the teeth on the gear, means for admitting an operating fluid to the pistons, and means for controlling the admission and exhaust of the operating fluid.

6. In clutch operating mechanism, a shaft, a casing secured to the shaft, relatively stationary and movable members disposed within the casing, one of said members being provided with an extension adapted to engage a socket formed in the adjacent member, a revoluble sleeve connecting said members and provided with a peripheral gear, a clutch operating device actuated by the movable member, pistons operating within the casing and provided with racks meshing with the teeth on the gear, means for supplying an operating fluid to the pistons, and means for controlling the admission and exhaust of the operating fluid.

7. In clutch operating mechanism, a shaft, a casing secured to the shaft, relatively stationary and movable members disposed within the casing, an operating sleeve connecting said members, a clutch operating device actuated by the movable member, pistons disposed within the casing and operatively connected with the sleeve for actuating the latter, means for supplying fluid under pressure to the pistons for actuating the latter to operate the clutch device, means for controlling the admission and exhaust of the operating fluid, and means for forming a cushion at the rear of the pistons when said pistons are actuated to release the clutch operating device.

8. In clutch operating mechanism, a shaft, a casing secured to the shaft and provided with a plurality of cylinders, relatively stationary and movable exteriorly threaded members disposed within the casing, a clutch operating device actuated by the movable member, a sleeve connecting said members and provided with a peripheral gear, pistons operating within the cylinders and provided with racks disposed on opposite sides of the gear and meshing with the teeth of the latter, means for supplying an operating fluid to the casing, and means for controlling the admission and exhaust of the operating fluid.

9. In clutch operating mechanism, a shaft, a casing secured to the shaft and provided with cylinders, ported diaphragms extendion across said cylinders, relatively stationary and movable members arranged within the casing, a clutch operating device actuated by the movable member, a sleeve connecting said members, a gear wheel carried by the sleeve, pistons operating within the cylinders, racks carried by the pistons and meshing with the teeth on the gear, means for supplying fluid to the pistons to effect the working stroke of the latter, means for controlling the admission and exhaust of the operating fluid, and means for forming a cushion at the rear of the pistons on the return stroke thereof.

10. In clutch operating mechanism, a shaft, a casing secured to the shaft and provided with cylinders having fluid passages communicating therewith, relatively stationary and movable members disposed within the casing, a clutch operating thrust pin actuated by the movable member, pistons working within the cylinders and operatively connected with said members for effecting the operation of the movable member, means for supplying fluid through the fluid passages to actuate the pistons, and means for controlling the admission and exhaust of the operating fluid.

11. In clutch operating mechanism, a shaft, a casing secured to the shaft and provided with cylinders, relatively stationary and movable members disposed within the casing, a pin connecting the stationary member with the casing, a similar pin for preventing rotation of the movable member, a clutch operating thrust pin operated by the movable member, pistons working within the cylinder and operatively connected with said members, and means for controlling the admission and exhaust of an operating fluid.

12. In clutch operating mechanism, a shaft, a casing secured to the shaft and provided with cylinders, a ported diaphragm forming one end of each cylinder, there being fluid passages arranged on each side of the ported diaphragms, relatively stationary and movable members disposed within the casing, a rotatable sleeve connecting said members and provided with a gear, pistons operating within the cylinders and provided with racks meshing with the teeth on the gear, a clutch operating thrust pin actuated by the movable member, fluid conductors connected with the fluid passages, and a ported valve for controlling the admission and exhaust of the fluid through said conductors.

13. In clutch operating mechanism, a shaft having a threaded terminal, a cap engaging the threads on the shaft and having its interior walls threaded, a casing engaging the interior threads of the cap and provided with cylinders, relatively stationary and longitudinally movable members disposed within the casing and provided with right and left hand threaded portions, a sleeve engaging the threads on said members and provided with a peripheral gear, pistons operating within the cylinders, racks carried by the pistons for engagement with the teeth on the gear, a clutch operating thrust pin extending through the shaft and actuated by the movable member, means for supplying an operating fluid to the pistons, and means for controlling the admission and exhaust of said operating fluid.

14. In clutch operating mechanism, a shaft, a casing secured to the shaft and provided with cylinders, diaphragms disposed within the casing, a relatively stationary member secured to one of the diaphragms and having a reduced extension, a rotatable and longitudinally movable member slidably mounted in an opening in the other diaphragm, said members being provided with right and left hand exterior threads, means for preventing rotation of the movable member, a sleeve engaging the threads on said members and provided with a gear wheel, pistons operating within the cylinders, racks carried by the pistons and engaging the teeth on the gear wheel, a clutch operating device actuated by the movable member, means for supplying fluid to the interior of the casing, and means for controlling the admission and exhaust of the operating fluid.

15. In clutch operating mechanism, a shaft, a casing secured to the shaft, a relatively stationary exteriorly threaded member disposed within the casing, a longitudinally movable exteriorly threaded member co-acting with the stationary member, a sleeve engaging the threads on said members, a clutch operating thrust pin actuated by the movable member, a gear secured to the sleeve, pistons operating within the casing and provided with racks for engagement with the teeth on the gear, means for locking the movable member against rotation, means for supplying fluid to the pistons, and means for controlling the admission and exhaust of the fluid.

16. In clutch operating mechanism, a shaft, a casing secured to the shaft, relatively stationary and movable members disposed within the casing, a clutch operating device actuated by the movable member, pistons operatively connected with said members, means for supplying fluid to opposite sides of the piston, a ported valve for controlling the admission and exhaust of the operating fluid, and a by-pass for permitting a relatively small quantity of fluid at the rear of the pistons on the outward stroke of the latter.

17. In clutch operating mechanism, a shaft, a casing secured to the shaft, relatively stationary and movable members disposed within the casing, a clutch operating device actuated by the movable member, pistons arranged within the casing and operatively connected with said members, there being fluid passages arranged at each end of the piston cylinders, a valve casing having an exhaust port and provided with fluid conductors communicating with the fluid passages in the casing, a ported valve arranged within the valve casing for controlling the admission and exhaust of the operating fluid, and a by-pass for admitting a relatively small quantity of fluid to the rear of the pistons on the outward stroke of the latter.

18. In clutch operating mechanism, a shaft, a casing secured to the shaft, relatively stationary and longitudinally movable members disposed within the casing, a clutch operating device actuated by the movable member, pistons working within the casing and operatively connected with said members, a valve casing having an exhaust port and provided with fluid conductors for supplying fluid to the pistons, a valve operating within the valve casing and provided with a port for controlling the admission and exhaust of the fluid through the conductors, and a by-pass forming a source of communication between one of the conductors and the interior of the valve casing for admitting a small quantity of fluid at the rear of the pistons on the outward stroke of the latter thereby to form a cushion.

19. In clutch operating mechanism, a casing, stationary and movable members disposed within the casing, an actuating member connecting the stationary and movable members, a clutch operating device actuated by the movable member, and means for operating the actuating member.

20. In clutch operating mechanism, a casing, exteriorly threaded stationary and movable members disposed within the casing, a correspondingly interiorly threaded actuating member engaging the threads on the stationary and movable members, a clutch operating device actuated by the movable member, and means for operating the actuating member.

21. In clutch operating mechanism, a casing, relatively stationary and movable alined telescopic members disposed within the casing, an actuating member connecting the stationary and movable members, a clutch operating device actuated by the movable member, and means for operating the actuating member.

In testimony that I claim the foregoing as my own, I have hereto affixed my signature in the presence of two witnesses.

HARRY LEON TURNEY.

Witnesses:
   J. L. JENNINGS,
   C. E. MACK.